June 8, 1965  L. K. BROADRICK  3,188,109
CONTAINER STAND AND CART
Filed June 25, 1962
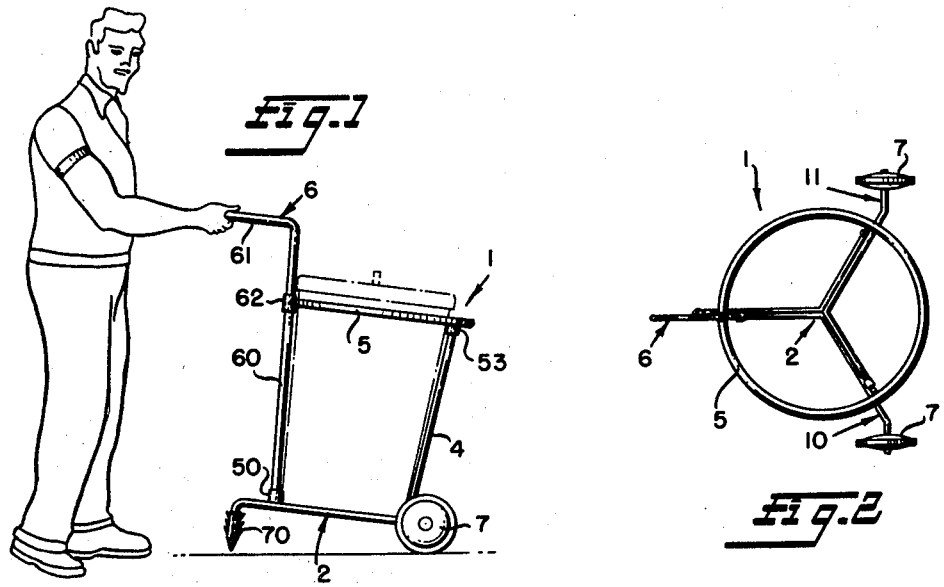
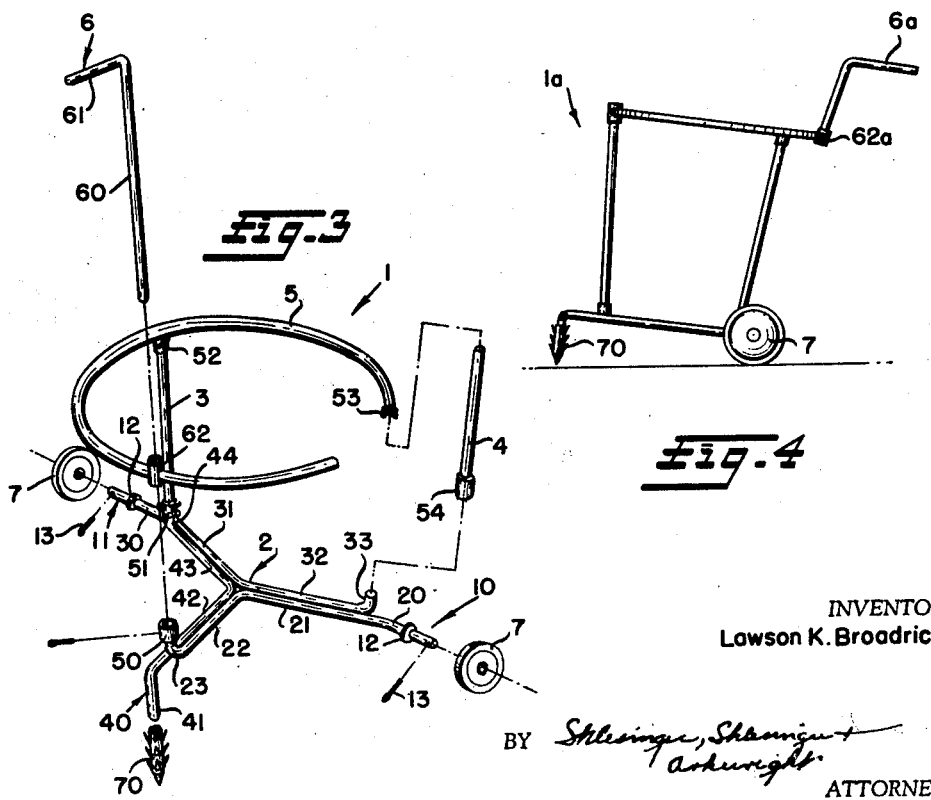
INVENTOR
Lawson K. Broadrick
BY Shlesinger, Shlesinger &
Arkwright
ATTORNEYS

United States Patent Office 3,188,109
Patented June 8, 1965

3,188,109
CONTAINER STAND AND CART
Lawson K. Broadrick, 3121 Piedmont Road NE.,
Atlanta 5, Ga.
Filed June 25, 1962, Ser. No. 204,878
5 Claims. (Cl. 280—47.26)

This invention relates to vehicles for the purpose of serving as a combined cart and stand for containers such as garbage cans.

An object of this invention is to provide an improved combination stand and cart that is light weight and can be easily moved from place to place.

Another object of this invention is to provide a durable inexpensively manufactured cart and stand.

Still another object of this invention is to provide a stable vehicle and stand for garbage receptacles that cannot be easily upset by animals or the wind.

Yet another object of this invention is to provide a cart and stand that will allow movement of containers without danger of getting a person's hands and clothing soiled by contact with the container.

Still another object of this invention is to provide a combination cart and stand for containers that may be easily assembled and disassembled as well as being adaptable in size for varying sizes of containers such as trash cans.

Other objects and various further features of the invention will be pointed out or will occur to those skilled in the art from a reading of the following specification in conjunction with the accompanying drawings, in which;

FIGURE 1 is a side elevation view of the invention as it would be used by a walking attendant;

FIGURE 2 is a top plan view of the invention;

FIGURE 3 is an exploded view of the invention partially in section showing the assembly of parts;

FIGURE 4 is a side elevation view showing a modification of the invention.

Referring to the drawings, FIGURE 1 shows the cart or stand generally indicated as 1. The cart 1 comprises a horizontal support frame member 2, vertical support members 3 and 4, a supporting ring member 5, a handle member 6, and wheels 7.

The support frame member 2 (shown in FIGURE 3) comprises rigid axle frame members 10 and 11. The wheels 7 are freely rotatable on the axles 10 and 11 and are retained on the axles by stops 12 and cotter pins 13. Any suitable fastener may be used in place of cotter pins 13.

Axle 10 comprises horizontal angular portions 20, 21, 22 and vertical angular portion 23. Axle and frame member 11 comprises horizontal angular portions 30, 31, 32 and vertical angular portion 33. The axles 10 and 11 are connected to each other by foot and frame member 40. The foot and frame member 40 comprises a downwardly extending angular portion 41, horizontal angular portions 42, 43 and a vertical angular portion 44. The axles 10 and 11 are connected to foot member 40 and to each other by spot welding or any suitable fastening means. The connection of foot member 40 to axle 10 is made by connecting horizontal angular portion 22 to horizontal angular portion 42. The axle 11 is connected to foot member 40 by connecting horizontal angular portion 31 to horizontal angular portion 43. The axle 10 is connected to axle 11 by connecting horizontal angular portion 21 to horizontal angular portion 32. A connection of this type allows for even distribution of stresses which might occur in the movement of the cart as well as even distribution of the weight of the container on the support frame. Socket members 50 and 51 are connected to vertical angular portion 23 of axle frame member 10 and vertical angular portion 44 of foot frame member 40. Vertical support member 3 inserts in the socket member 51.

Supporting ring member 5 is attached to vertical support member 3 by socket member 52. Vertical support member 4 and socket members 53 and 54 connect supporting ring member 5 to axle 11.

The handle member 6 comprises shaft 60 and handle portion 61. The shaft 60 extends through guide member 62 and connects to socket member 50.

The connection of parts to the socket members may be made by any conventional means.

The angular portion 41 has a barbed shoe anchor member 70 attachment thereto. The shoe member 70 may be connected to angular portion 41 by any suitable means. The barbed shoe 70 penetrates into the ground therefore allowing the cart to be anchored to the ground, thereby preventing the accidental tipping over of the cart or stand as could be caused by the wind or animals. It is obvious that foot member 40 may have barbs manufactured thereon.

The construction of this invention allows for the changing of various size vertical support members 3 and 4, supporting ring members 5 and handle members 6 to make the cart or stand 1 adaptable for various size containers.

FIGURE 4 shows a modification of the invention in that handle member 6A is connected on the opposite side of the cart 1A by socket 62A or by any suitable connection means.

Any or all of the parts may be made of a plastic material or of a metal such as lightweight aluminum.

It can be readily seen the handle member 6 also serves as a vertical support member; that the axles 10 and 11 serve not only as axles but also as support frame members as well as vertical support members; and that foot member 40 also serves as a support frame member as well as a vertical support member.

In use, a trash container is inserted through the ring member 5, and lowered until the base of the container is resting on the horizontal support frame member 2.

The axle member 11 may have only one horizontal angular portion in place of the two horizontal angular portions 31 and 32.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as wall within the scope of the invention or the limits of the appended claims.

Having thus described my invention what I claim is:

1. A combination stand and cart for containers comprising a horizontal support frame, vertical support members, a supporting ring member, a handle member, wheels, said horizontal support frame including a pair of axle members and a foot member; said axle members having horizontal angular portions and a vertical angular portion; said foot member having a horizontal angular portion, a vertical angular portion, and a downwardly extending angular portion; each of said horizontal angular portions including a pair of angularly connected legs, each of said axle members having attached at one end thereof one of said wheels, one of said legs of one of said axle members connected to one of said legs of said foot member, one of said legs of the other of said axle members connected to the other of said legs of said foot member, the remaining of said legs of said axle members being connected to each other, one of said vertical support members connecting said supporting ring member to said vertical angular portion of said foot member, the other of said vertical support members connecting said supporting ring member to said vertical angular portions of each of said axle members, said handle member connected to said supporting ring member; whereby a space is defined to receive and support a container.

2. A combination stand and cart for containers as in claim 1 and wherein said foot member includes a barbed ground penetrating member extending therefrom.

3. A cart for containers including a plurality of interconnected parts, said parts comprising a pair of axle members, wheels on said axle members, a foot member, one of said axle members connected to the other of said axle members to form a first horizontal support, said one of said axle members connected to said foot member to form a second horizontal support, the other of said axle members connected to said foot member to form a third horizontal support, said horizontal supports abutting each other at the central vertical axis of said cart and radiating outwardly therefrom to form a Y shaped base, each of said members having a vertical leg, said vertical legs being spaced from each other and supporting a ring at the upper ends thereof, and a handle means connected to said ring; whereby said Y shaped base, said vertical legs, and said ring form a receptacle for receiving a container.

4. A trash can support comprising three horizontal members, each of said members having an angular horizontal bent portion therein, two of said members having wheels at one end thereof, the other of said members having a rigid ground engaging vertical support at one end thereof, a vertical brace extending upwardly from the other end of each of said members, one arm of each of said bent portions connected in side by side relationship to one arm of another of said bent portions, a ring member connected to said vertical braces at the upper ends thereof, and means for guiding said support.

5. A trash can support as in claim 4 and wherein said angular horizontal bent portion is located intermediate of the ends of said members, and said members each include an angular bent portion at the said one end thereof and a vertical angular bent portion at the said other end thereof.

References Cited in the file of this patent

UNITED STATES PATENTS

| 577,089 | Waring | Feb. 16, 1897 |
| 1,572,531 | Henkel | Feb. 9, 1926 |
| 2,501,895 | Gayle | Mar. 28, 1950 |
| 2,634,933 | Grimsley | Apr. 14, 1953 |
| 2,650,786 | Platt | Sept. 1, 1953 |
| 2,968,459 | Timmons | Jan. 17, 1961 |

FOREIGN PATENTS

| 1,155,562 | France | Dec. 2, 1957 |